United States Patent [19]

Tomita et al.

[11] 3,728,823
[45] Apr. 24, 1973

[54] THREAD GRINDING MACHINE

[75] Inventors: Tamaki Tomita, Okazaki; Kunihiko Unno; Akiyoshi Kobayashi, both of Kariya, all of Japan

[73] Assignee: Toyoda Koki Kabushiki Kaisha, Kariya-shi, Aichi-ken, Japan

[22] Filed: Apr. 29, 1971

[21] Appl. No.: 138,478

[30] Foreign Application Priority Data

May 5, 1970 Japan..................................45/38059

[52] U.S. Cl. ...............................51/95 TG, 90/11.62
[51] Int. Cl..............................B24b 3/00, B24b 5/00
[58] Field of Search ....................51/95 TG; 90/11.62

[56] References Cited

UNITED STATES PATENTS 2,371,685 3/1945 Flanders............................51/95 TG

*Primary Examiner*—Othell M. Simpson
*Attorney*—Oblon, Fisher & Spivak

[57] ABSTRACT

A thread grinding machine is provided with a head stock and a tail stock in opposing relation and a spindle for supporting one end of a workpiece to be thread ground is rotatably and axially slidably mounted on fluid bearings in the head stock being threadably engaged with a feed screw shaft secured to the head stock. Rotation of the spindle causes a simultaneous axial sliding movement thereof to grind a helical form in the workpiece. A holding shaft for supporting the other end of the workpiece is mounted on fluid bearings for slidable movement axially in the tall stock and is urged toward the head stock under a constant force sufficient to rotatably support the workpiece.

7 Claims, 6 Drawing Figures

Patented April 24, 1973

INVENTORS
TAMAKI TOMITA
KUNIHIKO UNNO
AKIYOSHI KOBAYASHI

BY Oblon, Fisher & Spivak

ATTORNEYS 3,728,823

THREAD GRINDING MACHINE

BACKGROUND OF THE INVENTION

This invention relates to a thread grinding machine for grinding a helical form in a workpiece.

In a conventional thread grinding machine, a workpiece to be thread ground is rotated by means of a spindle rotatably mounted in a head stock which is in turn mounted on a table, and a feed screw shaft in threaded engagement with the table is rotated in synchronism with the rotation of the workpiece, whereby the workpiece is thread ground. However, since the table supports the head stock, the tailstock and the workpiece thereon, a relatively heavy load is applied on the sliding portion of the table, thereby lowering responsiveness of the table movement relative to rotation of the spindle, which affects the required pitch accuracy of the threads of the workpiece.

Moreover, since the feed screw shaft is located remotely from the spindle, a gear arrangement comprising a plurality of gears is necessary for rotating the feed screw shaft in synchronism with the rotation of the workpiece, thereby complicating the machine, and the cumulative error of such gear arrangements is one factor of the pitch error of the threads being formed in the workpiece. It is therefore difficult to provide a threaded workpiece of high accuracy.

SUMMARY OF THE INVENTION

Accordingly, it is an object of the present invention to provide an improved thread grinding machine for performing a thread grinding operation without moving a table upon which a head stock and a tailstock are mounted for supporting a workpiece to be thread ground.

It is another object of the present invention to provide a thread grinding machine wherein a spindle and a holding shaft for supporting a workpiece are journaled in fluid bearings in a head stock and a tailstock, respectively.

It is still another object of the present invention to provide a thread grinding machine capable of performing both rough and fine grinding operations.

According to the present invention, the foregoing objects are attained by a thread grinding machine which comprises a table mounted on a bed and a head stock and a tailstock mounted on the table in opposing relation for supporting a workpiece to be thread ground. A wheel support for rotatably carrying a grinding wheel is mounted on the bed for movement toward and away from the workpiece. A spindle for supporting one end of the workpiece is rotatably and axially slidably journaled in a first fluid bearing means in the head stock and is threadably engaged with a feed screw shaft secured to the head stock. Drive means are provided for rotating the spindle. A holding shaft for supporting the other end of the workpiece is slidably journaled in a second fluid bearing means disposed in the tailstock and hydraulic actuator means are provided in the tailstock for selectively urging the holding shaft toward the head stock under a constant force of sufficient degree to rotatably support the workpiece.

DESCRIPTION OF THE DRAWINGS

Other objects, features and attendant advantages of the present invention will be more fully appreciated as the same becomes better understood from the following detailed description when considered in connection with the accompanying drawings, in which like reference numerals designate like or corresponding parts throughout the several views, and wherein.

DETAILED DESCRIPTION OF THE INVENTION

Figure 1:
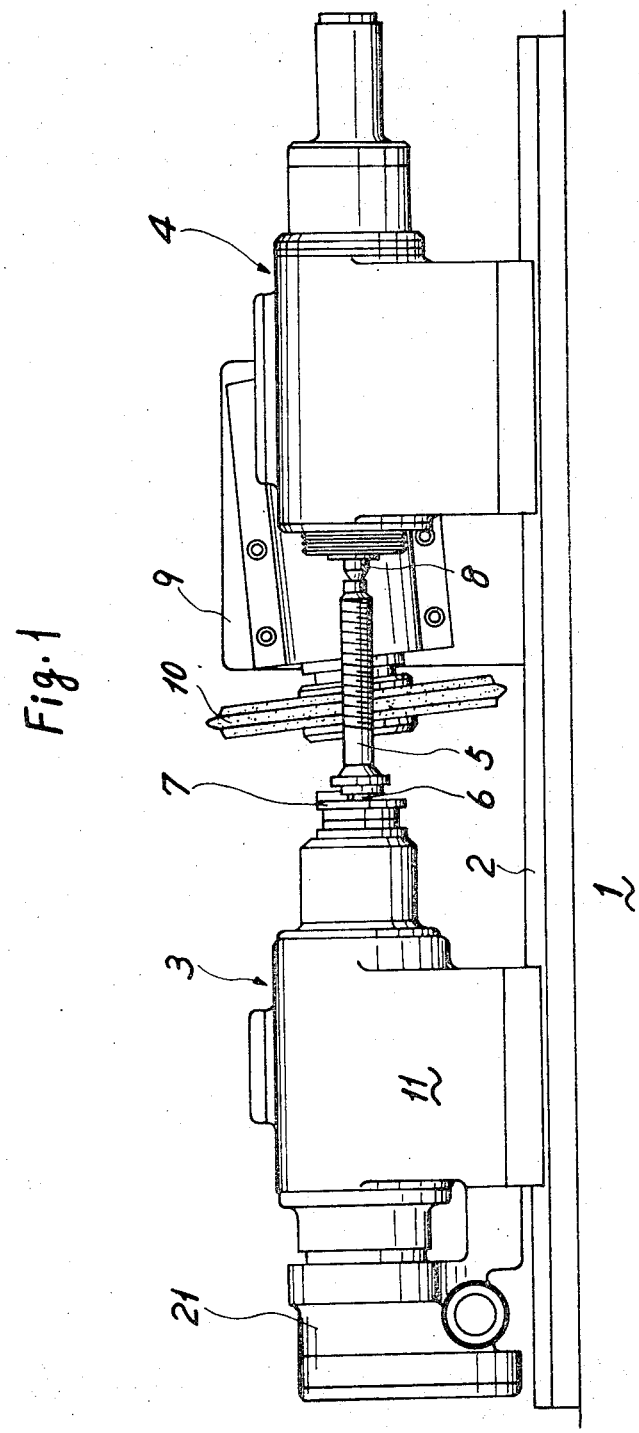
FIG. 1 is a front view of a thread grinding machine constructed according to the present invention.

Referring now to the drawings and particularly to FIG. 1, there is shown a bed 1 on which a table 2 is mounted. A head stock 3 generally indicated by numeral 3 and a tailstock generally indicated by numeral 4 are mounted on the table 2 in opposing relation so as to facilitate supporting a workpiece 5 to be thread ground therebetween by means of respective head stock and tail stock centers 6 and 8. A wheel support 9 is mounted on bed 1 for slidable movement transverse to the axis of workpiece 5 and rotatably carries a grinding wheel 10 for thread grinding the workpiece 5.

Figure 4:
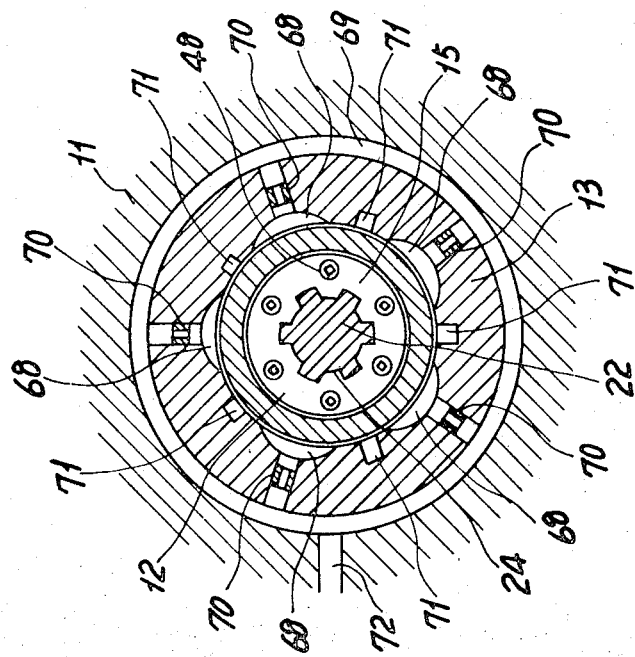
FIG. 4 is a sectional view taken along the line IV—IV of FIG. 2.

The head stock 3 will now be described in detail with reference to FIG. 2. Head stock 3 comprises a head stock housing 11 in which a spindle 12 is received for rotary and axial sliding movements by means of a pair of hydraulic bearings 13 secured to the opposite outer ends of the housing 11. More specifically, as shown in FIG. 4, the spindle 12 is fitted into each bearing 13 with a small clearance formed therebetween. Each bearing 13 is provided with a plurality of bearing pockets 68 spaced at substantially equal intervals about the inner circumference thereof, each pocket 68 being connected to an annular groove 69 formed in the outer peripheral wall of the bearing through a radially extending restrictor 70. Annular groove 69 is connected to a port 72 formed in the housing 11 which is, in turn, connected to a fluid supply source. An elongate axially extending groove 71 is provided between every adjacent pair of bearing pockets 68. With this arrangement, when a pressure fluid is supplied into pockets 68 through inlet port 72, annular groove 69 and restrictors 70, the pressure fluid may be evacuated from axial grooves 71 through the small clearances between the spindle 12 and the bearings 13, thereby permitting the spindle 12 to be hydraulically supported within the housing 11 for rotary and axial displacement therein.

Figure 2:
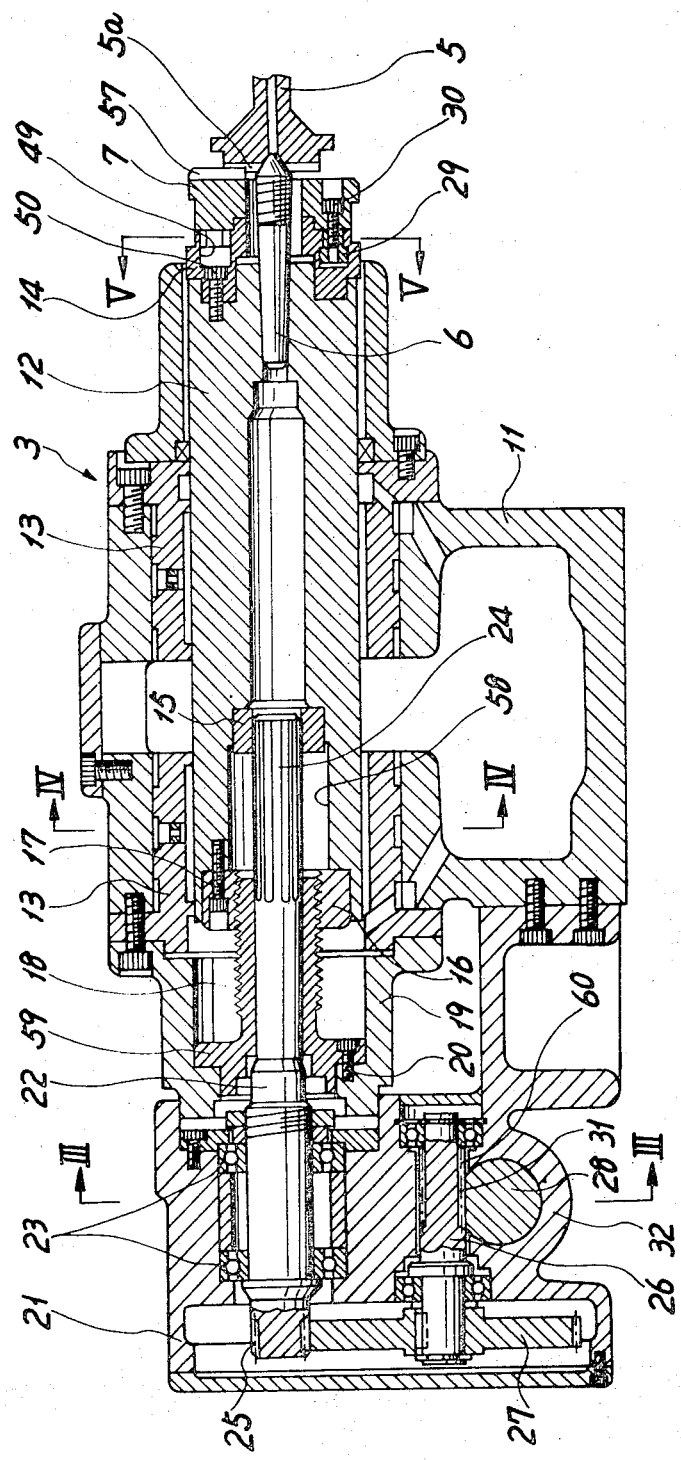
Fig. 2 is a detail fragmentary front view of a head stock shown in FIG. 1.
Figure 5:
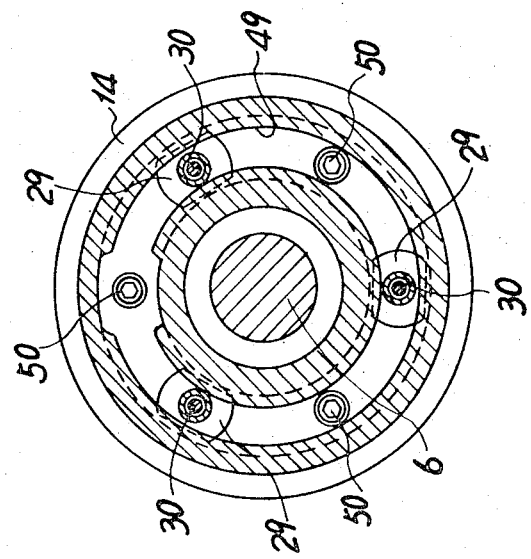
FIG. 5 is a sectional view taken along the line V—V of FIG. 2.

A face plate 14 is secured to the outer end of spindle 12 and has an annular groove 49 formed therein concentric with the axis of spindle 12 and being T-shaped in cross-section, or having a channel of greater radial extent in either direction formed on the inner or bottom surface thereof, as shown in FIGs. 2 and 5. A plurality of T-nuts 29 are slidably disposed in the T-shaped groove 49, each having a mating bolt 30 screwed therein to clamp an index plate 7 in a desired angular position with respect to the face plate 14. Into the outer end of spindle 12 the center 6 is axially fitted, the outer end thereof projecting from the index plate 7 to support the workpiece 5. Index plate 7 has at its outer end a projection 57 which is adapted to engage a radial slot 5a formed on the workpiece 5 so that rotary motion may be transmitted thereto from the rotating spindle 12.

The spindle 12 is provided with a bore 58 on the inner end thereof to receive a spline member 15 having centrally a female spline and being secured to a shoulder portion formed in the base of bore 58 by means of bolts 48, as shown in FIG. 4. A threaded member 16 is secured to the inner end of spindle 12 by means of bolts 17 in coaxial relation with spline member 15 and has centrally disposed therein a female threaded portion engaged by a hollow feed screw shaft 18. A flange portion 59 formed at one end of screw shaft 18 is secured by bolts 20 to the inner wall of a mounting member 19 secured to one end of the housing 11. With this arrangement, the threaded member 16 is rotated together with the spindle 12, and since the feed screw shaft 18 is immobilized, the spindle 12 is caused to move axially within bearings 13 through the threaded engagement between threaded member 16 and screw shaft 18 as it is rotated.

A casing 21 disposed outside mounting member 19 is secured to one end of housing 11. A drive shaft 22 is rotatably mounted in casing 21 by means of bearings 23. The drive shaft 22 has at its one end a male spline 24 extending through hollow screw shaft 18 and being in spline engagement with the female spline of spline member 15. Formed on the other end of drive shaft 22 is a gear 25 which engages a gear 27 formed on one end of a shaft 26 rotatably supported in casing 21 in parallel relation with drive shaft 22. Shaft 26 has also a pinion 60 in engagement with a rack 31 formed on a piston 28 which is slidably mounted in a cylinder 32 formed integrally with casing 21 for movement perpendicular to the axis of shaft 26, as shown in FIGS. 2 and 3.

Figure 3:
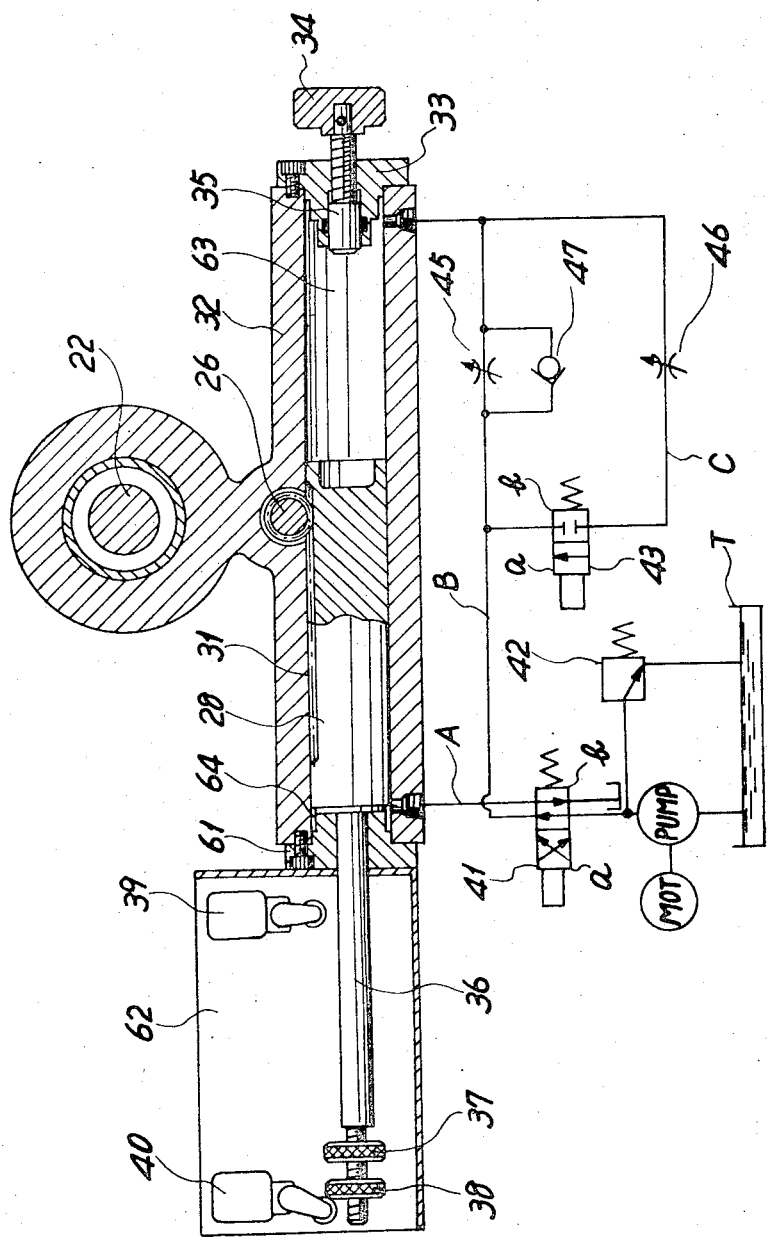
FIG. 3 is a sectional view taken along the line III—III of FIG. 2.

As best shown in FIG. 3, the right end of cylinder 32 is covered by a cap 33 into which a stop member 35 is adjustably screwed for limiting the stroke of piston 28. Adjustment of stop member 35 is effected by rotating a knob 34 secured thereto. A rod 36 secured to the left end of piston 28 extends beyond a cap 61 secured to the left end of cylinder 32 and carries two spaced dogs 37 and 38. Two limit switches 39 and 40, operatively associated with the respective dogs 37 and 38, are mounted on a bracket 62 secured to cap 61 so as to confirm rightward and leftward movements, respectively, of predetermined amounts of piston 28. A hydraulic control circuit for cylinder 32 comprises a first change over valve 41 for changing the direction of movement of piston 28, a variable throttle 45 for a fine grinding operation provided in a line B leading to a right chamber 63 of the cylinder 32, a variable throttle 46 less restrictive than throttle 45 for a rough grinding operation provided in a by-pass line C parallel to line B, and a second change over valve 43 provided in line C for selectively shutting off line C to change between rough and fine grinding operations. A check valve 47 is provided in parallel to throttle valve 45. A line A connects a left chamber 64 of cylinder 32 to the first change over valve 41. A relief valve 42 is provided to maintain a fluid pressure supplied to cylinder 32 constant.

Figure 6:
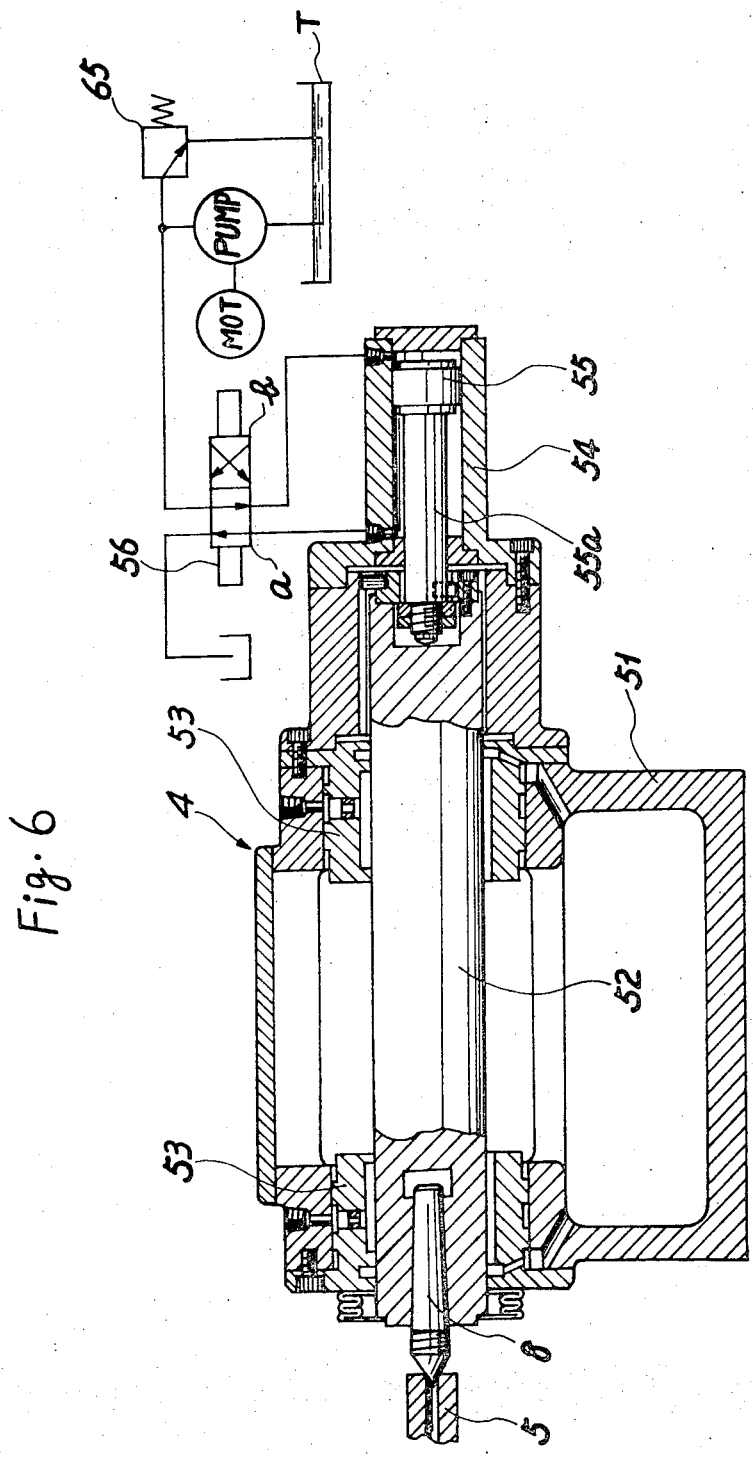
FIG. 6 is a detail fragmentary front view of a tail stock shown in FIG. 1.

Referring to FIG. 6, the tailstock 4 comprises a tail stock housing 51 in which a holding shaft 52 is received for axial sliding movement therewithin on hydraulic bearings 53 secured to opposite outer ends of the housing 52. Hydraulic bearings 53 are substantially identical with bearings 13 of the head stock 3. One end of the holding shaft 52 has fitted thereinto the tailstock center 8 for supporting one end of the workpiece 5 and the other end thereof is connected with a piston rod 55a of a piston 55 slidably mounted in a cylinder 54 secured to the outer end of housing 51. A change over valve 56 is provided for selectively moving the piston 55 and holding shaft 52 toward the head stock 3 under a constant pressure. Reference numeral 65 indicates a relief valve for maintaining the fluid pressure being supplied to cylinder 54 at a constant level.

The operation of the mechanism hereinbefore described will now be set forth. The workpiece 5 to be thread ground is located between the head stock and tailstock centers 6 and 8, with the radial slot 5a thereof being engaged with the projection 57 of index plate 7 which is clamped in its desired angular position. Change over valve 56 is then changed to the position indicated at a in FIG. 6 to move the holding shaft 52 and tailstock center 8 toward the head stock 3 under a constantly applied force sufficient to rotatably hold the workpiece 5. Upon completion of mounting workpiece 5 between centers 6 and 8, grinding wheel 10 is moved transversely to the axis of workpiece 5 by suitable means, not shown, so that workpiece 5 is plunge ground by a predetermined cutting amount. The first and second change over valves 41 and 43 are then changed to their positions indicated at a in FIG. 3 so that fluid under pressure is supplied into the left chamber 64 to move piston 28 to the right, as viewed in FIG. 3, at a rough grinding speed established primarily by the throttle 46. Rightward movement of the piston 28 causes counterclockwise rotation of shaft 26, as viewed in FIG. 3, which, in turn, is transmitted to drive shaft 22 by means of gears 27 and 25. This rotation of the drive shaft 22 causes rotation of the spindle 12, and thus of workpiece 5, through the spline engagement between drive shaft 22 and spline member 15 secured to spindle 12. Furthermore, rotation of the spindle 12 and workpiece 5 causes the same to move axially in a leftward direction, as viewed in FIG. 2, through the threaded engagement between threaded member 16 secured to spindle 12 and the feed screw shaft 18 secured to mounting member 19, whereby the workpiece 5 being urged by the holding shaft 52 is thread ground to the same pitch as the feed screw shaft. Rightward movement of piston 28 is limited by stop member 35 and is confirmed by the actuation of limit switch 39 by dog 37. Upon actuation of the limit switch 39, grinding wheel 10 is retracted from the workpiece 5 a predetermined distance and at the same time the first change over valve 41 is changed to the position indicated at b in FIG. 3 so that piston 28 is moved to the left at a rapid speed. Leftward movement of piston 28 causes reverse rotation and rightward axial movement of the spindle 12 and workpiece 5. Leftward movement of piston 28 is confirmed by limit switch 40, upon actuation of which by dog 38, a first rough grinding operation is completed.

In this embodiment, a rough grinding operation is performed twice for an increase in thread grinding accuracy, so that a second rough grinding operation is performed after the first rough grinding operation in the same manner as in the first operation.

Upon completion of the second rough grinding operation, the grinding wheel 10 is again moved transversely to the axis of workpiece 5 to plunge grind workpiece 5 by a predetermined cutting amount. The first and second change over valves 41 and 43 are then switched to their positions indicated at a and b, respectively, so that fluid under pressure is supplied into left chamber 64 to move piston 28 to the right, as viewed in FIG. 3, at a fine grinding speed set by throttle 45. Similarly to the rough grinding operation, the rightward movement of piston 28 causes rotation and leftward axial movement of the spindle 12 and the workpiece 5, so that a fine grinding operation is performed. Limit switch 39 is actuated upon engagement of piston 28 with the stop member 35 so that grinding wheel 10 is retracted from workpiece 5 and at the same time, the first change over valve 41 is switched to its position indicated at b. Piston 28, is, therefore, moved to the left at a rapid speed. Leftward movement of the piston 28 causes reverse rotation and rightward axial movement of spindle 12 and workpiece 5 to move the same to their original positions shown in FIG. 2. Change over valve 56 is then changed to its position indicated at b for retracting the holding shaft 52 and tailstock center 8 from workpiece 5 to remove the finished workpiece 5 from between centers 6 and 8.

While the invention has been described by means of a specific embodiment, it should be understood that the novel characteristics thereof may be incorporated in other structural forms without departing from the spirit and scope of the invention as defined in the following claims.

What is claimed as new and desired to be secured by Letters Patent of the U.S. is:

1. A grinding machine for grinding a workpiece comprising:
    a bed;
    a table mounted on said bed;
    a head stock and a tailstock mounted in opposing relation on said table for supporting said workpiece;
    a grinding wheel support mounted on said bed for movement toward and away from said workpiece;
    a spindle for supporting one end of said workpiece;
    fluid bearing means for rotatably and axially slidably supporting said spindle in one of said head stock and said tailstock;
    means for rotating said spindle;
    means non-rotatably secured to said one of said head stock and said tailstock and being threadably engaged with said spindle for axially sliding said spindle therein upon rotation thereof by said rotating means;
    means for transmitting rotation of said spindle to said workpiece;
    means slidably mounted in the other of said head stock and said tailstock for supporting the other end of said workpiece; and
    means for urging said workpiece other end supporting means toward said one of said head stock and said tailstock.

2. A thread grinding machine for grinding a workpiece comprising:
    a bed;
    a table mounted on said bed;
    a head stock and a tailstock mounted on said table in opposing relation for supporting said workpiece to be thread ground;
    a grinding wheel support mounted on said bed for movement toward and away from said workpiece;
    first fluid bearing means provided in said head stock;
    a spindle rotatably and axially slidably mounted in said first fluid bearing means for supporting one end of said workpiece;
    a feed screw shaft secured to said head stock and being threadedly engaged with said spindle;
    drive means for rotating said spindle;
    means mounted on said spindle for transmitting rotation of said spindle to said workpiece;
    second fluid bearing means provided in said tailstock;
    a holding shaft slidably mounted in said second fluid bearing means for supporting the other end of said workpiece; and
    hydraulic actuator means provided in said tailstock for selectively urging said holding shaft toward said head stock.

3. A thread grinding machine as set forth in claim 2, wherein said first and second fluid bearing means each comprises a pair of spaced fluid bearings;
    each bearing having a plurality of bearing pockets spaced at substantially equal intervals about the inner circumference thereof;
    each bearing being connected to a fluid pressure supply through a restrictor; and
    groove means provided in the inner circumference of each bearing for exhausting pressure fluid passing through said pockets and the clearance between each bearing and said spindle.

4. A thread grinding machine as set forth in claim 2, further comprising means for clamping said rotation transmitting means on said spindle in a desired angular position relative to said spindle.

5. A thread grinding machine as set forth in claim 2, wherein said drive means comprises:
    a hydraulic cylinder;
    a piston slidably received in said cylinder and having a piston rod thereon;
    means connecting said piston and said spindle for rotating said spindle in response to movement of said piston in said cylinder;
    a fluid pressure supply; and
    fluid control circuit means between said supply and the opposite sides of said hydraulic cylinder for selectively supplying fluid pressure to one side of said cylinder while simultaneously exhausting fluid from the other side for moving said piston in one direction and supplying fluid pressure to the other side of said cylinder while exhausting fluid from one side for moving said piston in the opposite direction.

6. A thread grinding machine as set forth in claim 5, wherein said hydraulic cylinder is provided with an adjustable stop member for permitting adjustment of the stroke of said piston.

7. A thread grinding machine as set forth in claim 5, wherein said fluid control circuit means comprises:
- a first throttle in a first fluid communication path between said supply and said one side of said hydraulic cylinder;
- a check valve in a second fluid communication path parallel with said first fluid communication path;
- a second throttle less restrictive than said first throttle in a third fluid communication path parallel with said first fluid communication path; and
- a change over valve in said third fluid communication path for selectively shutting off said third fluid communication path.

* * * * *